UNITED STATES PATENT OFFICE.

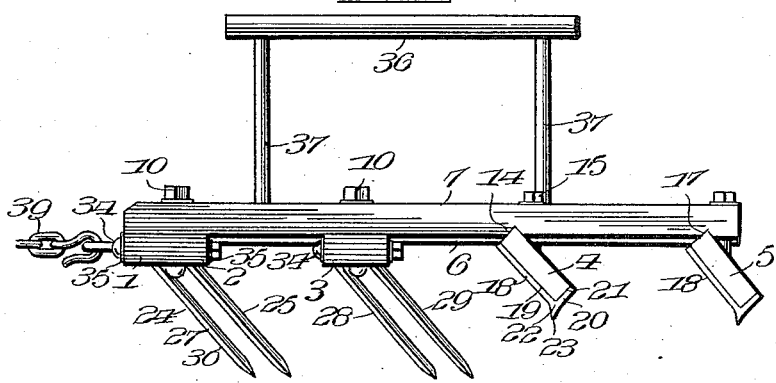

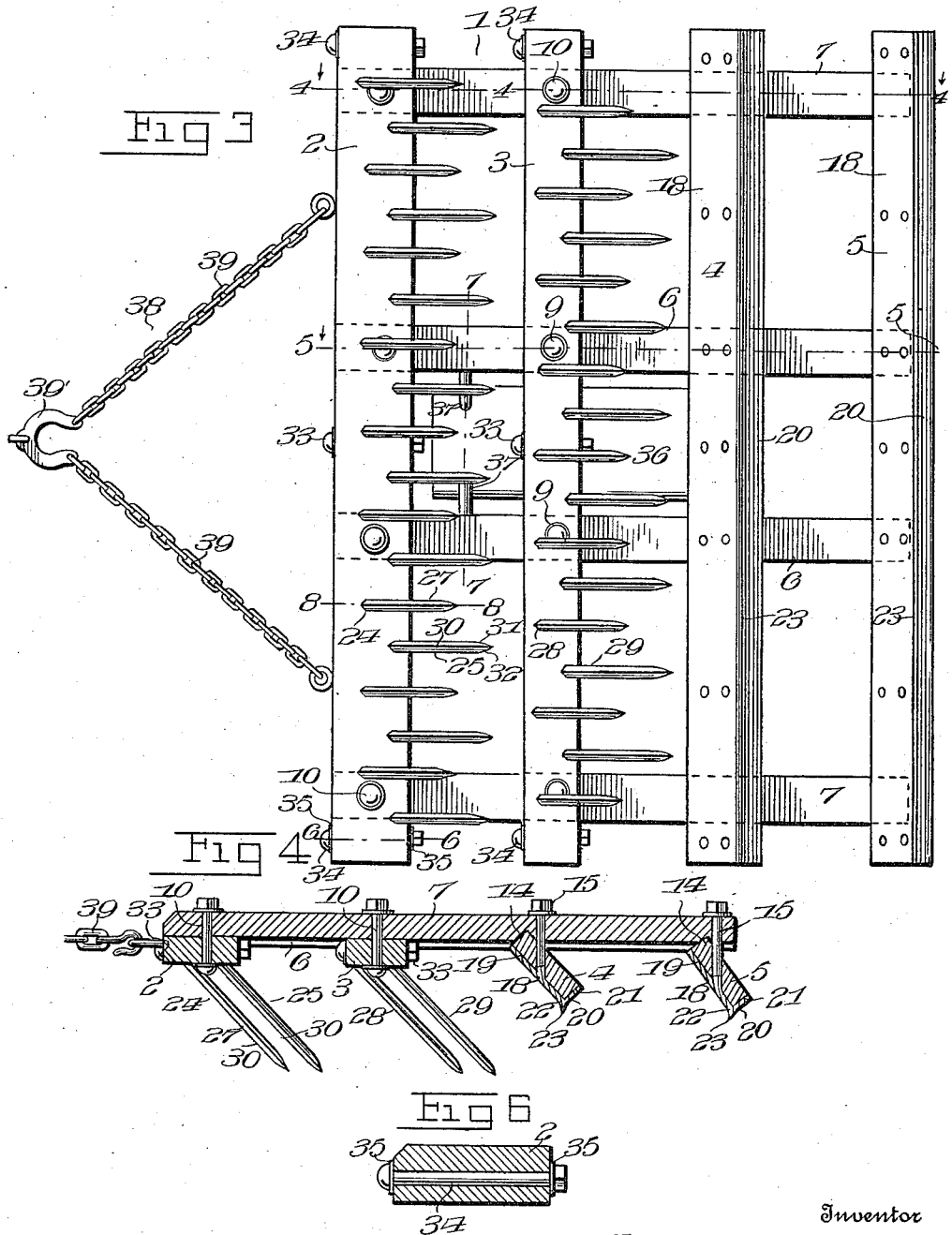

ISRAEL F. BOOTS, OF HARTFORD CITY, INDIANA.

CLOD CRUSHER AND PULVERIZER.

1,059,823.  Specification of Letters Patent.  Patented Apr. 22, 1913.

Application filed June 25, 1912. Serial No. 705,798.

*To all whom it may concern:*

Be it known that I, ISRAEL F. BOOTS, a citizen of the United States, residing at Hartford City, in the county of Blackford and State of Indiana, have invented new and useful Improvements in Clod Crushers and Pulverizers, of which the following is a specification.

This invention relates to clod crushers and pulverizers and has for an object to provide an agricultural machine of this character which will include trailing crushing teeth and pulverizing drags rearwardly of the teeth whereby the soil will be effectually pulverized after being initially acted upon by the trailing teeth.

Another object of the invention is to provide a clod crusher and pulverizer wherein the companion pulverizing drags will be disposed at different angles, the rear drag having its effective pulverizing surface disposed below the plane of the corresponding surface of the forward drag whereby to insure the proper pulverization of the soil.

Another object of the invention is to provide in the frame construction of the machine means for effectually preventing the longitudinal splitting of the tooth bars.

Another object of the invention is to provide for an arrangement of the tooth bars so as to maximize the crushing efficiency of the teeth and to so arrange the teeth that they may be readily sharpened when worn.

In the drawing forming a portion of this application, and in which like letters of reference indicate similar parts in the several views:—Figure 1 is a side view of the machine. Fig. 2 is a view similar to Fig. 1 showing the machine tilted. Fig. 3 is a bottom plan view of the machine. Fig. 4 is a section on line 4—4 of Fig. 3. Fig. 5 is a section on line 5—5 of Fig. 3. Fig. 6 is a section on line 6—6 of Fig. 3.

The clod crusher and pulverizer comprises a portable frame 1 which includes one or more tooth bars, two being employed herein and illustrated at 2 and 3 and pulverizing drags bars 4 and 5. All of these bars are connected centrally by spaced supporting members 6 and end supporting members 7. The bars 2 and 3 are disposed in the same general plane and as illustrated they have portions extending into rabbeted portions 8 on the undersides of the central supporting bars 6 and secured thereto by vertical bolts 9, while the said bars 2 and 3 are secured by similar bolts 10 to the end supporting bars 7. The said central supporting bars 6 are provided with alining recesses 11 for the reception of the upper corners of the drag bar 4, the walls 12 of said recesses being forwardly inclined while the walls 13 are inclined downwardly and rearwardly. The upper flat surface of the drag bar 4 is in contact with the long walls 13 of the recesses while the relatively narrow short edge of the drag bar is in flat contact with the short walls 12 whereby the drag bar will be angularly supported with relation to the plane of the central frame bars 6. Recesses 14 which are similar to the recesses 11 receive the ends of the said bar 4 as shown in Fig. 1, the said recesses being formed in the bar 7 of the frame and disposed in line with the recesses 7. Fastening devices 15 are passed through the drag bar 4 through the intermediate bar 6 and the end bar 7 whereby the drag is effectually sustained in proper position upon the frame. The rear drag 5 has intermediate portions fitted in recesses 16 in the central frame bar 6 while the ends of said drag are fitted in similar recesses 17 in the end frame bar 7, the recesses 17 being substantially identical with the recesses 14 while the recesses 16 are similar to the recesses 11, the difference being in the angular dispositions of the walls of said recesses whereby the drag bar 5 will be supported from the frame at a greater angle than the bar 4. It is also said that the recesses 16 are relatively shallow as compared with the recesses 11 whereby the lower corner of the drag 5 is disposed below the plane of the lower corner of the drag bar 4.

To maximize the crushing efficiency of each drag bar I secure thereto metallic plates 18 which wholly cover the front surfaces 19 of the drag bars and which are provided with walls 20 which underlie the lower edges 21 of the drag bars. Each plate 20 is provided with a relatively thickened portion 22 whose walls converge downwardly so as to present throughout the length of each drag a sharp cutting edge 23. The plates 18 while maximizing the crushing efficiency of the drags also reinforce the drags longitudinally so as to prevent their splitting on coming in contact with rocks or obstructions.

The front pulverizing bar 2 of the machine is provided with a front row of drag teeth 24 and a rear row of drag teeth 25, the former and the latter being arranged in staggered relation as shown. Each tooth is of rectangular configuration, being provided with a shank 26 which is fitted in a correspondingly formed passage in the bar 2 and a downwardly and rearwardly extending cutting portion 27. The tooth bar 3 is provided with a front row of teeth 28 and a rear row of teeth 29, the latter being arranged in staggered relation with the former while both of these rows are also arranged in staggered relation to the similar rows of teeth upon the front bar 2 so as to present a very broad cutting surface and to insure a satisfactory crushing of the soil. The teeth 28 and 29 are also extended downwardly and rearwardly being disposed in parallel relation with the teeth of the front bar 2. By providing teeth of rectangular configuration in cross section it is evident that each tooth presents a broad cutting edge 30 throughout its entire length, the surfaces 31 and 32 of each tooth being relatively arranged so as to permit of their being sharpened with a file when the cutting edge becomes worn.

With a view to preventing the tooth bars 2 and 3 from splitting longitudinally I employ central transverse bolts 33 which are passed through the bars and similar bolts 34 which are passed through the ends of said bars, the said bolts being provided with companion washers 35 which securely engage against the opposite sides of the bars.

In order that the frame 1 may be tilted under shifting movements of the driver's weight I provide the frame with a centrally located relatively long seat 36 having supporting posts 37 which are secured in the central frame bars 6. The seat is wholly arranged in the frame 1 and disposed thereon so that when the driver's weight is shifted to the front thereof his full weight will be applied to the trailing teeth of the bars 2 and 3. When the driver's position is shifted rearwardly upon the seat the frame will be tilted rearwardly and downwardly whereby the effective crushing surfaces of the bars 4 and 5 will be brought into engagement with the soil to insure the crushing thereof as is understood. From this construction it is evident that at the discretion of the operator his position may be shifted longitudinally upon the frame depending upon the ground conditions that may require an application of his weight to the trailing crushing teeth or to the pulverizing drags upon the machine.

A suitable draft attachment 38 has portions 39 connected with the front tooth bar 2 at the opposite sides of the center thereof while the forward portion of the attachment is equipped with a clevis 39 for attachment to the draft animal.

It is stated that the seat 36 of the machine finds a fulcrum on the cutting teeth of the machine whereby to permit the frame to be tilted as described.

I claim:—

A clod crusher and pulverizer comprising a frame having central bars and end bars, tooth bars secured to the central bars and to the end bars and arranged in parallel relation thereon, the central bars and the end bars having relatively deep recesses therein and relatively shallow recesses therein, the sides of said deep and shallow recesses respectively being formed at different angles, a drag bar secured to the central bars and to the end bars and having portions secured in the relatively deep recesses whereby the drag bars will be held at one angle, and a second drag bar having portions fitted in the relatively shallow recesses in the central and end bars respectively whereby the said second bar is supported at another angle and disposed with its effective pulverizing surface disposed below the pulverizing surface of the first drag bar.

In testimony whereof I affix my signature in presence of two witnesses.

ISRAEL F. BOOTS.

Witnesses:
 DAVID J. HUMMER,
 LAWRENCE W. DAUGHERTY.

---

Copies of this patent may be obtained for five cents each, by addressing the "Commissioner of Patents, Washington, D. C."